Feb. 22, 1949.   H. H. TRAIL   2,462,819
TRANSMISSION OIL FILTER MEANS
Filed July 3, 1944

INVENTOR:
Herbert H. Trail.

Patented Feb. 22, 1949

2,462,819

UNITED STATES PATENT OFFICE 2,462,819

TRANSMISSION OIL FILTER MEANS

Herbert H. Trail, Kalamazoo, Mich., assignor to Fuller Manufacturing Company, Kalamazoo, Mich., a corporation of Delaware Application July 3, 1944, Serial No. 543,239½

7 Claims. (Cl. 184—13)

1

The present invention relates to a gear transmission oil filter and has for its purpose to remove dirt, metallic chips and grindings, and other foreign matter from the lubricating oil of gear transmissions.

Such oil filters now in use are usually provided with some form of a pump to circulate the lubricating oil through the filter element, and require in addition to the pump, means to drive the pump, and necessary pipes and fittings, all of which, complicate the mechanism and incur additional cost of manufacture.

Briefly stated, my invention contemplates the following improvement:

The provision of a gear transmission oil filter so designed that velocity imparted to the lubricating oil by the revolving gears is retarded to provide an increased pressure differential, and in such a manner as to circulate the oil through the filter element, thereby eliminating the necessity of a special pump for the purpose. Also, to provide an efficient oil filter system to transmissions already in use without any modification to the transmission.

The invention will be better understood when reference is made in the following description to the accompanying drawings wherein Figure 1 is a sectional elevation view of the filter assembly.

Similar reference numerals refer to corresponding parts throughout the several drawings.

Figure 1:
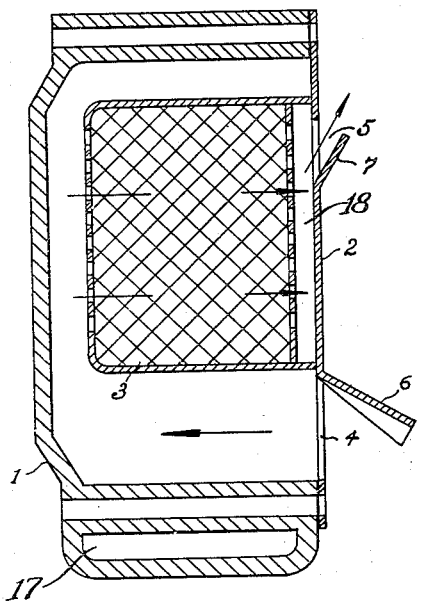
Figure 2:
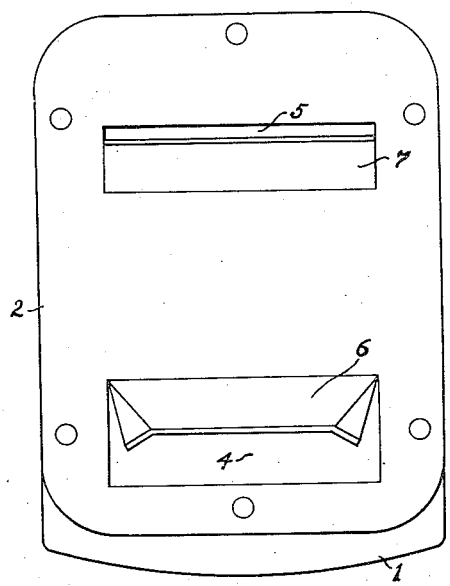
Figure 2 is a front view of the filter assembly showing the inlet and outlet openings and baffles.

The numeral 1 is the filter assembly case. 2 is a cover plate to which is secured—by any suitable means—the filter element 3 which may be of any suitable variety, well known to those in the art. It is noted that the outlet side of the filter element 3 is parallel spaced at 18 from the cover plate 2 to provide a substantially large unrestricted and quiescent outlet area of the filter element 3 to provide a free exit of the oil circulating through the filter element and elimination of any back pressure. The inlet opening 4 and the outlet opening 5 are formed in the cover plate 2, and the baffles 6 and 7 may also be formed upon, or secured to, the cover plate 2. The standard power take-off openings usually formed in the gear cases are hole threaded at 8 and machine faced at 9, to which face the filter assembly may be conveniently secured with the cover plate 2 interposed between the filter case 1 and the face

2

Figure 3:
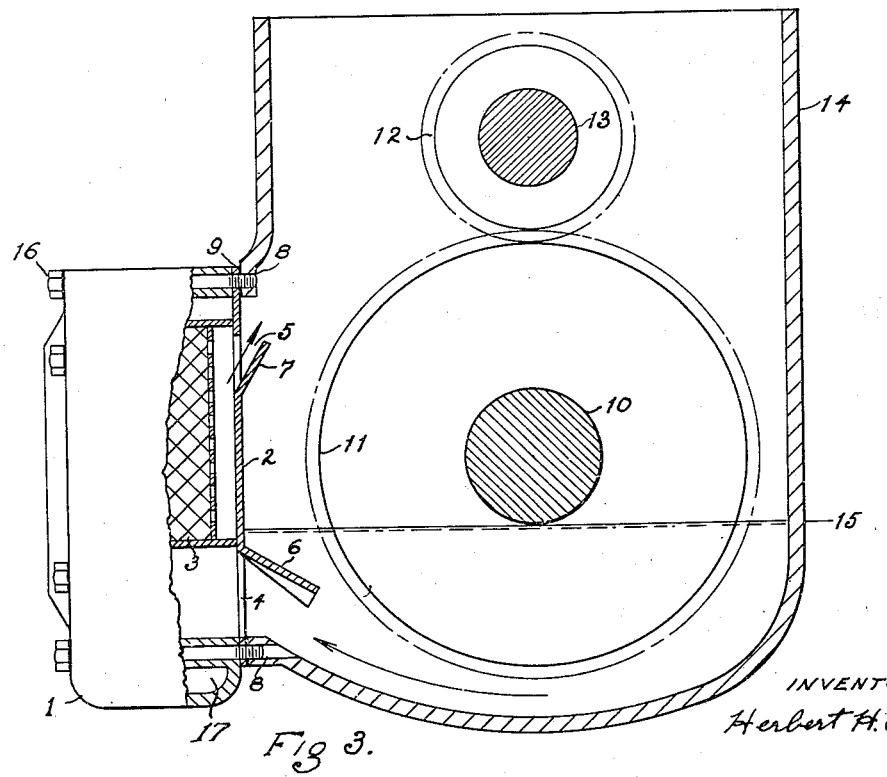
Figure 3 is a part cross sectional view with the filter assembly in its attached position to the gear transmission case.

9 as shown in Figure 3. The countershaft 10 supports the gear 11 and the drive gear 12 is supported for rotation with the drive shaft 13. The shafts 10 and 13 are mounted for rotation within the transmission gear case 14 in which is maintained an oil bath to the approximate level shown at 15. The filter assembly as shown in Figure 1 is secured to the power take-off opening of the gear case 14 by the cap screws 16.

The power take-off opening also the baffle 6— which extend into the gear case and adjacent the gear 11—together with the inlet opening 4, are in the radial path of one or more of the gears, such as gear 11, so that velocity imparted to the lubricating oil by the rotating gear or gears may be retarded by the baffle 6. It is also noted that the filter assembly casing 1 is formed with an extension 17 forming a sump.

In operation, the lubricating oil level within the transmission gear case 14 would approximate that shown at 15 and the countershaft gear 11 revolving in the direction as indicated by the arrow. At speed, the velocity imparted to the oil by the rotating gear 11 would be retarded by the baffle 6 being in the path of travel of the oil, and thereby, creating an increased pressure differential directly below the baffle 6 and at the inlet opening 4 to the filter assembly. It is noted that while the inlet opening 4 is below the baffle 6, the outlet opening 5 is above the baffle 7. This arrangement causes the baffle 7 to divert the flow of oil circulating within the gear case away from the outlet opening 5 thereby eliminating the possibility of any pressure increase at the outlet opening 5. In this manner, the pressure differential as between the inlet and outlet openings causes a portion of the circulating oil to pass into the filter case 1 through the filter element 3 and out of the filter assembly by way of the outlet opening 5 as indicated by the arrows in Figure 1. It is further noted that while the velocity of the oil centrifuged and rotated by the gears may be great before approaching the baffle 6, it is greatly retarded at this point thereby causing backward eddies above the baffle which neutralize the centrifuging effect of the gears upon the oil at this point and adjacent the outlet opening 5, so much so, that in some instances it has been found that the baffle 7 could be eliminated, as a pressure differential still existed as between the inlet and outlet openings sufficient to cause circulation of the oil through the filter element 3.

In the foregoing it is described how it is possible by utilizing the centrifuging effect upon the oil, caused by the rotating gears of a geared transmission, to create and utilize a pressure differential to circulate the oil through a filter element to purify the oil, and to adapt the filter assembly for application to existing geared transmissions having power take-off openings.

While the invention has been described more or less in detail it is obvious that the said baffles may be formed in the gear case, or that the gear case contour may be formed to provide in effect, one or more of the said baffles referred to, and that various modifications and rearrangements will suggest themselves to those in the art, and all such modifications and rearrangements are contemplated as falling within the scope of the following claims.

What I claim is:

1. A filter device for cleaning oil in a geared transmission case having an opening in the radial path of a rotatable gear, comprising; a filter casing secured over said opening to act as a cover therefor; a plate interposed between said casings substantially closing said opening; the said plate having an inlet and an outlet opening; a filter element through which oil may pass to be cleansed, said element disposed within said filter case and having its inlet communicated with said inlet opening and its outlet communicated with said outlet opening, said inlet and outlet openings spaced apart in the direction of travel of said gear, of baffles formed on or secured to said plate intermediate said openings and projecting into said transmission case whereby oil set in motion by rotation of said gear is forced into said inlet opening and away from said outlet opening to cause circulation of the oil through said filter element.

2. A filter device for cleaning oil in a geared transmission case having a power take-off opening in the radial path of a rotatable gear, comprising; a filter casing secured over said opening to act as a cover therefor; a plate interposed between said casings to provide a compartment in which a filter element is disposed, said plate having an inlet opening and an outlet opening, said inlet opening communicating with the inlet side of said filter element, said outlet opening communicating with the outlet side of said filter element, a baffle on said plate extending into said transmission case, said inlet and outlet openings and baffle in the radial path of said gear and the baffle formed and positioned whereby oil centrifuged by rotation of the gear is forced into the said inlet opening to circulate through the filter element for return to the transmission case in a cleansed condition.

3. A filter device for cleaning oil in a gear transmission case having a power take-off opening in one side wall thereof and having a rotatable gear therein the teeth of which travel past said opening in line therewith, comprising; a plate of a size to cover said opening and having a pair of openings therein spaced apart in the direction of travel of the gear; means cooperating with the plate in the formation of a passageway for oil, the inlet of the passageway being provided by one of said openings in the plate first swept by the teeth of the gear and the outlet of the passageway being provided by the other of said openings last swept by the teeth of the gear, said means including a part acting as a cover for the opening; a filter element in said passageway through which all oil circulating through the passageway must pass; and means cooperating with the teeth of the gear during rotation thereof for inducing oil circulation through the inlet of said passageway to the outlet thereof.

4. A filter device for cleaning oil in a geared transmission case having a rotatable gear in radial alignment with an opening in one side wall of the case normally closed by a cover, comprising; a filter case adapted to replace said cover, a plate substantially closing the open side of the filter case having inlet and outlet openings through which oil within the transmission case may pass, a filter element disposed within said filter case having its inlet communicated with said inlet opening and its outlet communicated with said outlet opening, of baffle means on said plate extending within said transmission case to divert oil following the rotation of said gear into said inlet opening and away from said outlet opening to cause the oil to pass through said filter element for return to the transmission in a cleansed condition, said outlet of the filter element spaced substantially in parallel relation to said plate to provide a quiescent area between the outlet of the filter element and the outlet opening.

5. A filter device for cleaning oil in a geared transmission case having a rotatable gear in radial alignment with a power take-off opening in one side wall of the case, comprising a filter case to cover said opening, a plate interposed between said cases of a size to cover the power take-off opening and having holes in its peripheral portions adapted to align with holes provided at the edge of the power take-off opening, inlet and outlet openings in said plate, a filter element disposed within said filter case having its inlet communicated with said inlet opening and its outlet communicated with said outlet opening, of baffle means interposed between said inlet and outlet openings to cause the oil centrifuged by rotation of the gear to enter said inlet opening and pass through said filter element and out return to the transmission case by way of said outlet opening.

6. A filter device for cleaning oil in a geared transmission case having an opening in one side wall thereof in the radial path of a rotatable gear, comprising; a filter casing secured over said opening to act as a cover therefor; a plate interposed between said casings substantially closing said opening and having inlet and outlet openings connecting said transmission case with said filter casing; a filter element disposed within said filter casing and having its inlet communicated with said inlet opening and its outlet communicated with said outlet opening; said inlet and outlet openings spaced apart in the direction of travel of said gear, the said inlet opening so located that the gear teeth sweep therepast when rotating in advance of said outlet opening; and means whereby oil centrifuged by the rotating gear is caused to produce a pressure differential to circulate oil through said inlet opening and filter element for return to the transmission case through said outlet opening in a cleansed condition.

7. A filter device for cleaning oil in a geared transmission case having an opening in the radial path of a rotatable gear, comprising; a filter casing secured over said opening to act as a cover therefor, a filter element and a sump to trap heavy particles disposed within said filter casing, a plate substantially closing said opening and having an inlet opening in communication with the inlet of said filter element and said sump and having an outlet opening in communication with the outlet of said filter element; the openings in said plate so disposed that the gear teeth sweep past said inlet opening before passing said outlet opening, and means whereby oil centrifuged by the rotating gear is caused to produce a pressure differential to circulate oil through said inlet opening into said sump and through said filter element for return to the transmission case through said outlet opening in a cleansed condition.

HERBERT H. TRAIL.

REFERENCES CITED

The following references are of record in the file of this patent:

UNITED STATES PATENTS

| Number | Name | Date |
| --- | --- | --- |
| 1,019,645 | Holdsworth | Mar. 5, 1912 |
| 1,483,830 | Moore | Feb. 12, 1924 |
| 1,508,914 | Belden | Sept. 16, 1924 |
| 2,356,953 | Snow | Aug. 29, 1944 |